(12) United States Patent
McLeod et al.

(10) Patent No.: US 8,310,757 B2
(45) Date of Patent: Nov. 13, 2012

(54) WIRE GRID POLARIZERS IN WINDOW SHADING APPLICATIONS AND VARYING THICKNESS WAVE RETARDERS

(75) Inventors: William McLeod, Central Islip, NY (US); Ryan Tatzel, Syosset, NY (US)

(73) Assignee: SmarterShade, Inc., South Bend, IN (US)

( * ) Notice: Subject to any disclaimer, the term of this patent is extended or adjusted under 35 U.S.C. 154(b) by 854 days.

(21) Appl. No.: 12/199,914

(22) Filed: Aug. 28, 2008

(65) Prior Publication Data

US 2010/0053751 A1 Mar. 4, 2010

(51) Int. Cl.
  *G02B 5/30* (2006.01)
  *G02B 27/28* (2006.01)
(52) U.S. Cl. .......... 359/490.01; 359/490.03; 359/486.03
(58) Field of Classification Search . 359/490.01–490.03
  See application file for complete search history.

(56) References Cited

U.S. PATENT DOCUMENTS

| | | | |
|---|---|---|---|
| 2,260,220 A | 10/1941 | Grabau | |
| 2,280,358 A | 4/1942 | Tietig | |
| 2,281,112 A | 4/1942 | Ryan | |
| 2,302,507 A | 11/1942 | Ryan | |
| 2,617,329 A | 11/1952 | Dreyer | |
| 3,159,844 A | 12/1964 | Haboush | |
| 3,443,855 A | 5/1969 | Land | |
| 3,504,962 A | 4/1970 | Shanley | |
| 3,521,300 A | 7/1970 | Weiss | |
| 3,528,722 A | 9/1970 | Makas | |
| 3,540,793 A | 11/1970 | Araugo et al. | |
| 3,663,089 A | 5/1972 | Makas | |
| 3,880,496 A | 4/1975 | Davidyan et al. | |
| 4,070,096 A | 1/1978 | Jasgur | |
| 4,123,141 A | 10/1978 | Schuler | |
| 4,153,952 A | 5/1979 | Dussich | |
| 4,285,577 A | 8/1981 | Schuler | |
| 4,364,375 A | 12/1982 | Younghouse | |
| 4,509,825 A | 4/1985 | Otto et al. | |
| 4,512,638 A * | 4/1985 | Sriram et al. | 359/352 |
| 4,579,426 A | 4/1986 | Onufry | |
| 4,719,720 A | 1/1988 | Olsen | |
| 4,773,733 A | 9/1988 | Murphy, Jr. et al. | |
| 4,902,112 A | 2/1990 | Lowe | |
| 4,962,780 A | 10/1990 | Engdahl et al. | |
| 5,033,829 A | 7/1991 | Faroughy | |

(Continued)

OTHER PUBLICATIONS

Chen et al., "Large flexible nanowire grid visible polarizer mad by nanoimprint lithograph" Applied Physics Letters, V90, N6, Feb. 8, 2007, pp. 063111-1-063111-3.

(Continued)

*Primary Examiner* — Jade R Chwasz
(74) *Attorney, Agent, or Firm* — The Marbury Law Group PLLC

(57) ABSTRACT

A light transmissive panel comprising a first sheet and a second sheet, wherein each sheet is made up of a non-birefringent substrate and a wire grid polarizer pattern of continuously varying absorption axis orientation formed on the non-birefringent substrate. The wire grid polarizer patterns on each of the first and second sheet are mechanically translatable relative to each other, wherein the mechanical translation controls transmission of light through the light transmissive panel. Light transmissive panels wherein each sheet of the panel is made of a wire grid polarizer that is laminated with a continuous variable thickness wave plate retarder, wherein the continuous variable thickness wave plate retarder rotates input light by an amount determined by the thickness of the wave plate retarder.

6 Claims, 15 Drawing Sheets

U.S. PATENT DOCUMENTS

| | | | |
|---|---|---|---|
| 5,164,856 | A | 11/1992 | Zhang et al. |
| 5,189,552 | A | 2/1993 | Metwalli |
| 5,841,581 | A | 11/1998 | Tutt |
| 5,940,216 | A | 8/1999 | Gibbs |
| 5,999,316 | A | 12/1999 | Allen |
| 6,185,039 | B1 | 2/2001 | Allen et al. |
| 6,368,760 | B1 | 4/2002 | Nishiguchi |
| 6,414,790 | B1 | 7/2002 | Bennett |
| 6,452,724 | B1 | 9/2002 | Hansen |
| 6,710,921 | B2 | 3/2004 | Hansen et al. |
| 6,878,425 | B1 | 4/2005 | Gomes |
| 7,113,335 | B2 | 9/2006 | Sales |
| 7,375,887 | B2 | 5/2008 | Hansen et al. |
| 7,548,370 | B2 | 6/2009 | Albert et al. |
| 7,630,132 | B2 | 12/2009 | Sangu et al. |
| 2001/0040730 | A1 | 11/2001 | Lee et al. |
| 2003/0142400 | A1 | 7/2003 | Hansen et al. |
| 2004/0120041 | A1 | 6/2004 | Silverstein et al. |
| 2006/0061862 | A1 | 3/2006 | Mi et al. |
| 2006/0193046 | A1 | 8/2006 | Yellin |
| 2006/0215263 | A1 | 9/2006 | Mi et al. |
| 2006/0262398 | A1 | 11/2006 | Sangu et al. |
| 2009/0190217 | A1 | 7/2009 | Chen et al. |

OTHER PUBLICATIONS

Ahn et al., "Fabrication of a 50nm half-pitch wire grid polarizer using nanoprint lithography" 2005 Nanotechnology, V16, N9, Jul. 22, 2005, pp. 1874-1877.

* cited by examiner

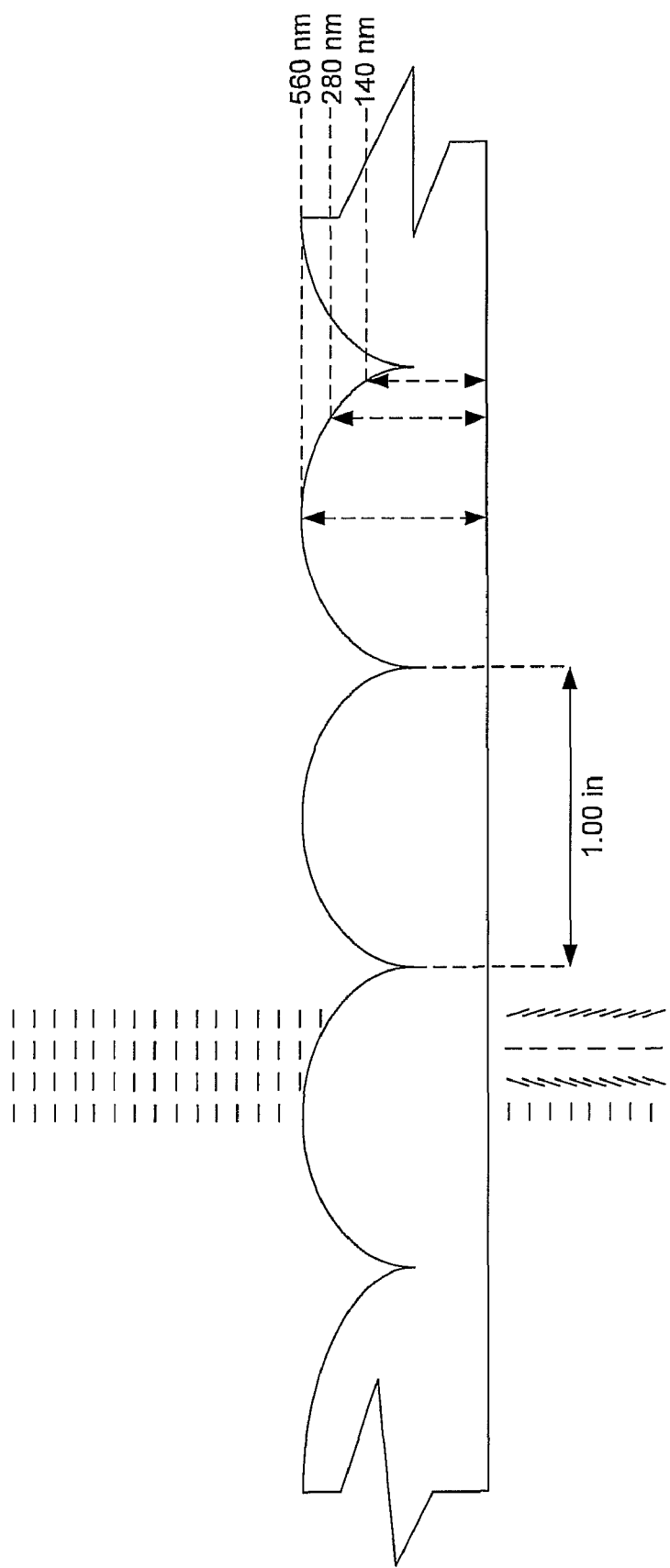

WIRE GRID POLARIZERS IN WINDOW SHADING APPLICATIONS AND VARYING THICKNESS WAVE RETARDERS

BACKGROUND OF THE INVENTION

1. Field of Invention

The present invention relates generally to the field of transmissive panels. More specifically, the present invention is related to the use of wire grid polarizers and wave retarders in transmissive panels.

2. Discussion of Prior Art

The U.S. Patent to Metwalli (U.S. Pat. No. 5,189,552) provides for an incidence angle light attenuator for light transmissive panels. Specifically, Metwalli teaches a method and apparatus for controlling light attenuation through a light transmissive panel that uses polarized film sheets positioned on opposite surfaces of the panel.

FIG. 1A illustrates Metwalli's light transmissive panel 10, such as a window or automobile windshield, wherein the transmissive panel 10 is covered by a film 12 on one surface and by a film 14 on an opposite surface. Each of the films 12 and 14 has a plurality of attenuating strips of different absorption axis of polarized films. Film 12 includes polarized strips 16 having an absorption axis aligned in a first predetermined direction. The strips 16 are arranged in generally horizontal, parallel rows spaced apart by sections of film strips 18 of absorption axis differently oriented from strips 16. Film 14 includes polarized strips 20 having an absorption axis aligned in the same predetermined direction as strips 16 and spaced apart by film strips 22 having an absorption axis oriented in the same direction as film strips 18. The strips 20 are aligned to overlay the film strips 16 while strips 22 overlay strips 18. The film sheets are oriented on the opposing surfaces of the panel such that light passing through within a preselected range of incidence angles passes through strips of common polarization. Light impinging on the panel at other incidence angles passes through strips of different polarization and is significantly polarized or may have varying polarization in order to provide attenuation within step changes.

FIG. 1B illustrates a traditional wire grid polarizers having a plurality of lines of conductive material running at nanoscales. For example, the spacing between the conductive wires is in the range of 150 nm. FIG. 1B illustrates a pattern formed by conductive wires 102 as applied to a nonbirefringant substrate 104. FIG. 1C illustrates a cross section of the wire grid polarizer shown in FIG. 1B.

One problem associated with the prior art, such as Metwalli, is that such setups, at a theoretical maximum, can only achieve 50% clarity at its clearest and 100% opacity at its darkest.

Another problem associated with the prior art, such as Metwalli, is that such traditional polarizers are made of organic compounds or iodine, which will degrade in exposure to direct sunlight over shorter time-spans (two years or less in their intended use in direct light).

Yet another problem associated with the prior art, such as Metwalli, is that they fail to achieve a mirror state at full opacity instead of a darkened state.

Further, the prior art, such as Metwalli, fail to provide a robust solution for selecting the level of light to transmit on a grayscale from near 0% to near 100%. In order to achieve a range of 50%-100% range with conventional polarizers, one must either manufacture one continuous polarizer with a plane of polarization in one direction then cut it into strips at differing angles and re-laminate them together in order, or one has to produce a continuous polarizer and stretch it (longitudinally in shear) until the plane of polarization approaches an s-curved shape. The former results in a large amount of waste material, takes a long time to achieve (and is difficult to automate) and results in visible "stripes" where the cuts were, even if done at perfect tolerance. The latter has proven difficult to achieve and must sacrifice some contrast ratio (ratio of clearest state to darkest state).

Whatever the precise merits, features, and advantages of the above cited references, none of them achieves or fulfills the purposes of the present invention.

SUMMARY OF THE INVENTION

The present invention's device uses nanoscale engineered wire grid polarizers (WGP's) to achieve polarization. An advantage of using WGP's is that while the prior art at a theoretical maximum can only achieve 50% clarity at its clearest and 100% opacity at its darkest, a WGP based aperture can achieve near 100% clarity (i.e., about 85% with a theoretical maximum of 100%) and still achieve 100% opacity at its darkest. Unlike the prior art polarizers that are made of organic compounds or iodine, which degrade with exposure to direct sunlight, WGP's are made of aluminum or other metals and are unaffected by exposure. Also, WGP's can achieve a mirror state at full opacity instead of a darkened state. This allows the user to reflect solar light and heat instead of absorbing it, and promises greater efficiency as a thermal block shade from solar heat gain. Further, the use of WGP's is ideal for the manufacture of devices that can be selected to transmit any level of light on a grayscale from near 0 to near 100%, because they can be manufactured with varying absorption axis orientations.

The present invention's device may also make use of varied thickness wave retarders to achieve the required polarization pattern. The pattern of polarization must vary across the direction of linear translation. A standard linear polarizer, or WGP can be used to produce the required varied polarization pattern by including an adjacent wave retarder. This wave retarder, having a varied thickness related to the wavelength of light being controlled, will rotate the polarized light to produce a required pattern. A second, adjacent (linearly translatable) wave retarder would then rotate this light to be all in the same orientation, but at a selected angle to the original angle.

In one embodiment, the present invention provides a light transmissive panel comprising: a first sheet and a second sheet, wherein each of said first and second sheets comprise a standard polarizer that is laminated with a continuous variable thickness wave plate retarder. The continuous variable thickness wave plate retarder rotates input light by an amount determined by the thickness of the wave plate retarder. The first and second sheets are mechanically translatable relative to each other, wherein the mechanical translation controls the transmission of light through said light transmissive panel.

In another embodiment, the present invention provides a light transmissive panel comprising: a first sheet and a second sheet, wherein each of the first and second sheets comprise a wire grid polarizer that is laminated with a continuous variable thickness wave plate retarder. The continuous variable thickness wave plate retarder rotates input light by an amount determined by the thickness of the wave plate retarder. The first and second sheets are mechanically translatable relative to each other, wherein the mechanical translation controls the transmission of light through said light transmissive panel.

In yet another embodiment, the present invention provides for a light transmissive panel comprising: a first sheet; and a second sheet, wherein each of the first and second sheets comprise a nonbirefringant substrate and a polarizing pattern of continuously varying absorption axis formed on said nonbirefringant substrate. The first and second sheets are mechanically translatable relative to each other, wherein the mechanical translation controlling transmission of light through said light transmissive panel.

BRIEF DESCRIPTION OF THE DRAWINGS

FIG. 3 depicts such a wave retarder for use in light transmissive panels according to the teachings of the present invention.

FIG. 5 illustrates patterns that have an "S" shape in the polarization direction or, more accurately, the shape of two tangent C's

DESCRIPTION OF THE PREFERRED EMBODIMENTS

Figure 1A:
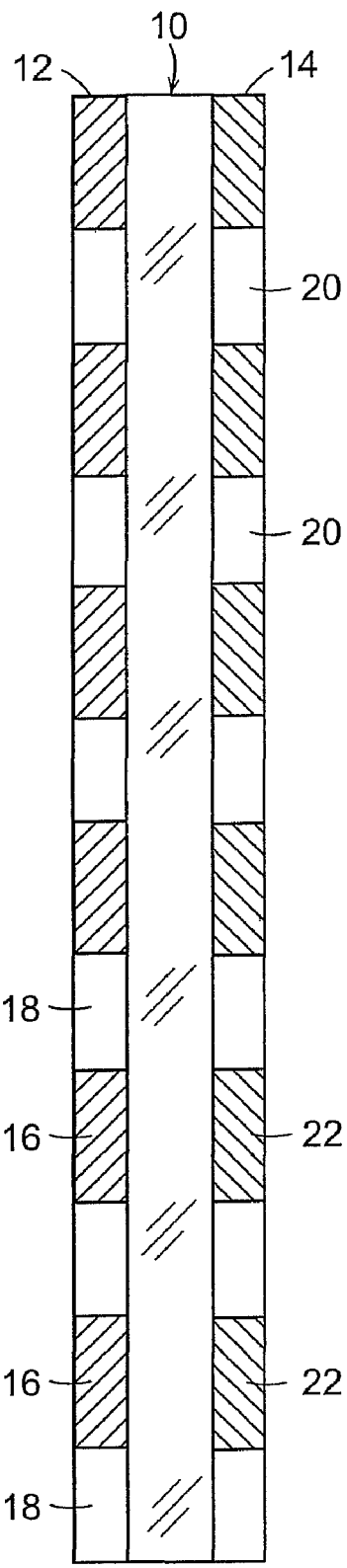
FIG. 1A illustrates a prior art light transmissive panel, such as a window or automobile windshield, wherein the transmissive panel is covered by a film on one surface and by another film on an opposite surface.
Figure 1C:
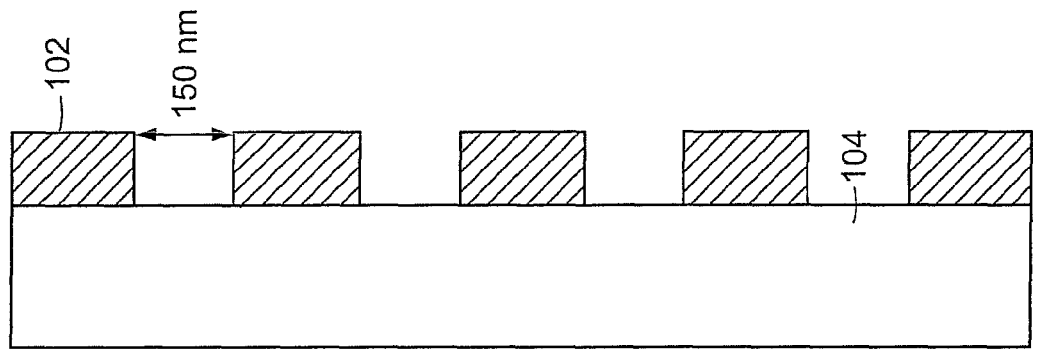
FIG. 1C illustrates a cross section of the wire grid polarizer shown in FIG. 1B.
Figure 1B:
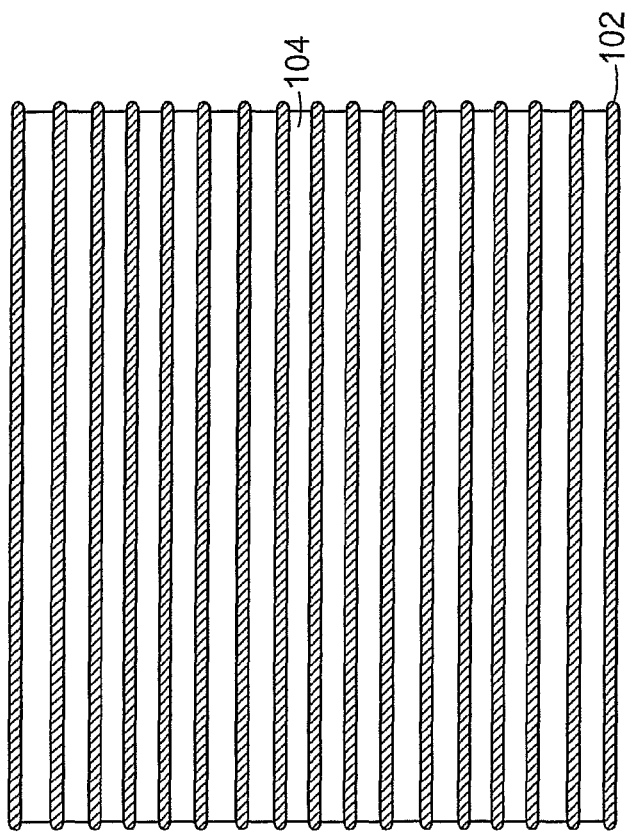
FIG. 1B illustrates a traditional wire grid polarizers having a plurality of lines of conductive material running at nanoscales.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Figure 2A:
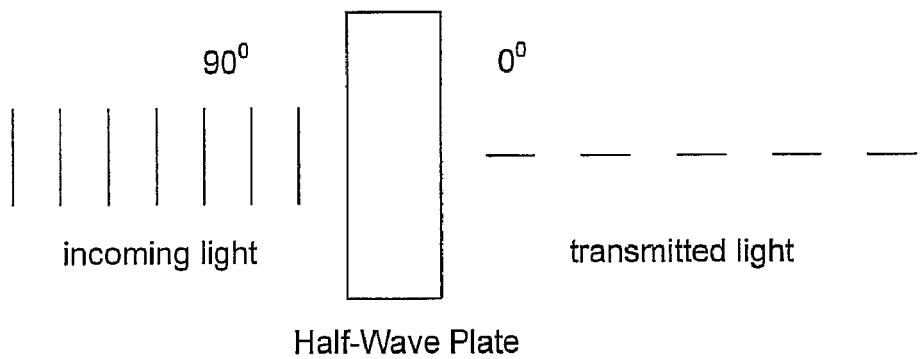
FIG. 2A through FIG. 2C illustrate the rotation of polarized light by various angles depending on the varying thickness of the wave retarder used.
Figure 2B:
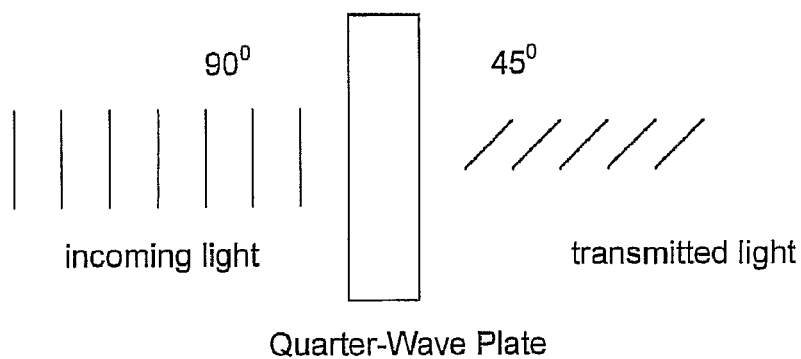
Figure 2C:
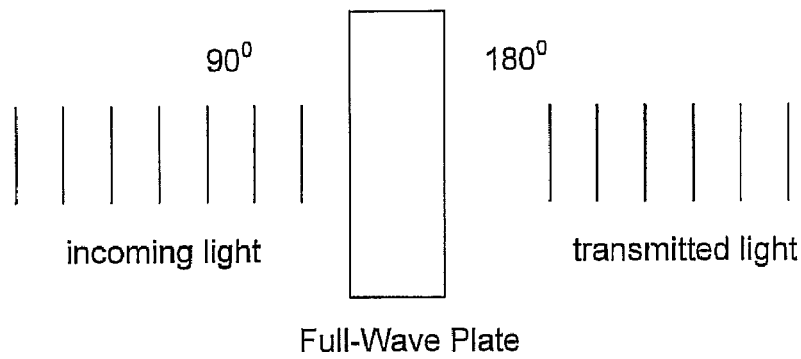

FIG. 2A through FIG. 2C illustrate the rotation of polarized light by various angles depending on the varying thickness of the wave retarder used. FIG. 2A depicts a half-wave plate that takes vertically polarized light, represented by vertical lines | |, and rotates it to horizontally polarized light, represented by horizontal lines - -. FIG. 2B depicts a quarter-wave plate that takes vertically polarized light, represented by vertical lines | |, and rotates it at an angle to form angularly polarized light, represented by slanted lines / /. FIG. 2C depicts a full-wave plate that takes vertically polarized light, represented by vertical lines | |, and rotates it back to vertically polarized light, represented by vertical lines | |.

It is seen from FIG. 2A-C that the varying thickness of the plate or wave retarder causes a variance in the rotation of the polarized light. The present invention's wave retarder takes advantage of the properties shown in FIG. 2A-C by providing a variable thickness wave retarder for use in light transmissive panels, wherein the present invention's wave retarder creates a continuously varying pattern of polarization by rotating uniform pattern of polarized light in continuously varying degrees. FIG. 3 depicts such a wave retarder for use in light transmissive panels according to the teachings of the present invention.

Figure 4:
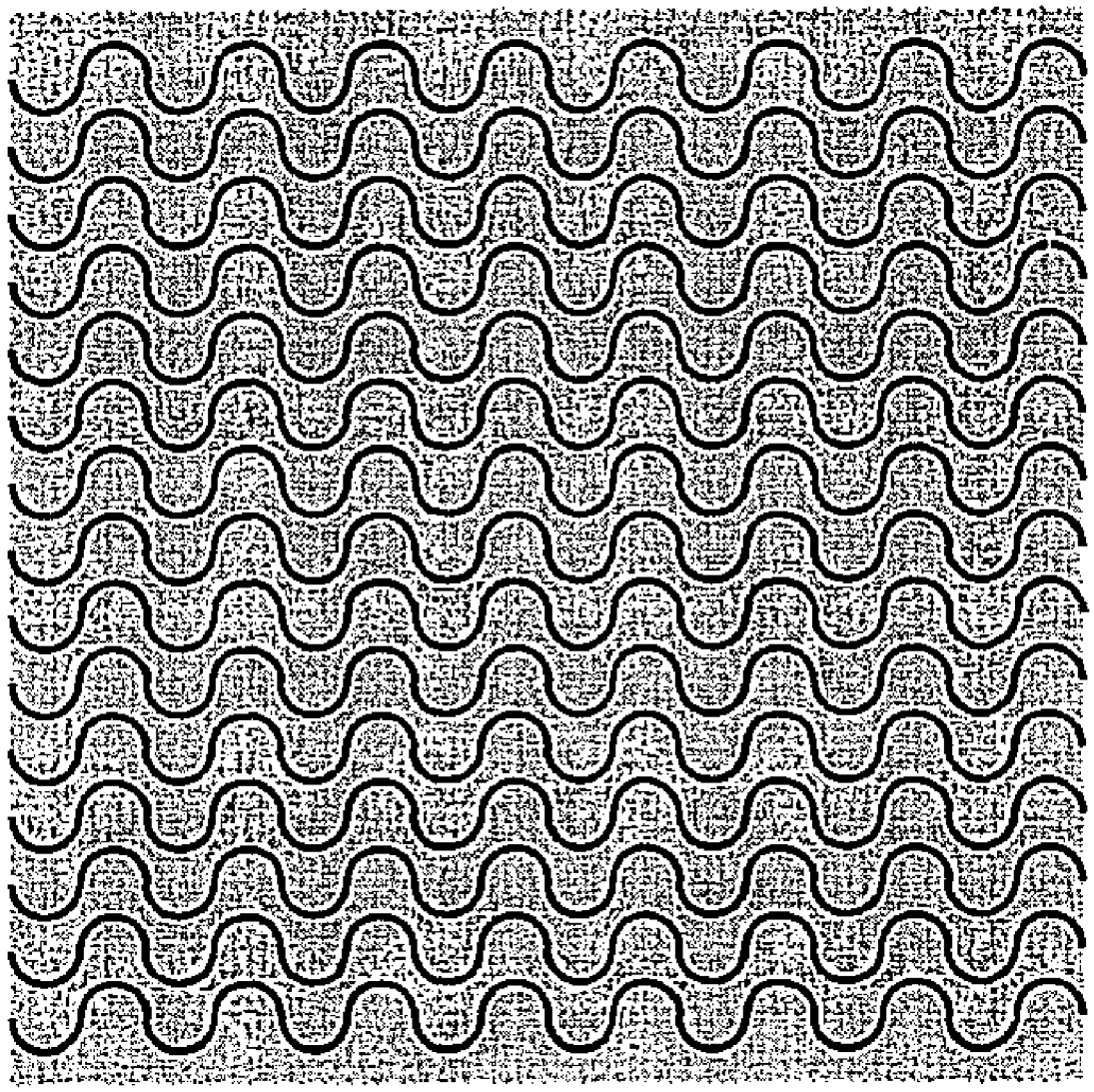
FIG. 4 illustrates an example pattern as applied to a nonbirefringant substrate.

FIG. 4 illustrates such an example pattern as applied to a nonbirefringant substrate.

Figure 5:
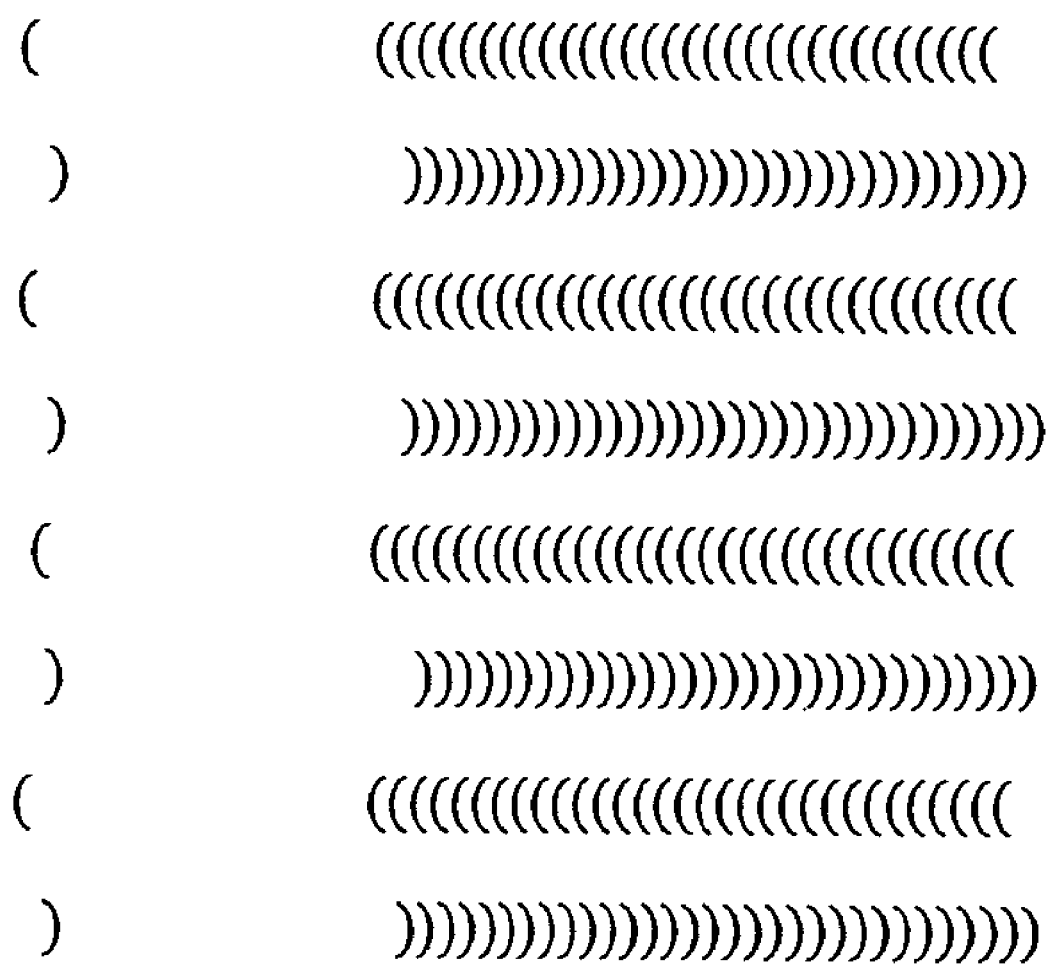

According to one embodiment of the invention, a basic assembly would include two sheets of clear nonbirefringant substrate and their polarized coatings (sheet A and B). Sheets A and B would be essentially the same. Sheet A can be mechanically translated relative to sheet B by a throw distance (about an inch). Sheets A and B would have a repeating polarizing pattern in stripes down their lengths and continuous across their widths. Ideally, we hope to produce patterns that have an "S" shape in the polarization direction, or more accurately the shape of two tangent C's. The polarization direction should be able to polarize light that starts horizontal and continuously varies in angle, from 0 as horizontal, to 180 as horizontal. This would mathematically be described as a plotting of a line with tangents at any point representing angles of polarization orientation such that when the two lines were overlapped in phase the corresponding tangent angles would all be parallel, and when the lines were overlapped 180 degrees out of phase the tangent angles would all be orthogonal to their corresponding mates. FIG. 5 illustrates an example of this pattern.

The width of the sheet would be the same across but the length would contain continuously varying sections. In a first embodiment, this can be achieved through the emerging nano-manufacturing process of nanoimprint lithography (NIL). A combination of NIL on a nonbirefringant polymer substrate and the use of a deposition (metal nanocoating) technique have been used in test to produce large, low cost wire grid polarizers. The article by Ahn et al. titled "Fabrication of a 50 nm half-pitch wire grid polarizer using nanoimprint lithography" (*Nanotechnology*, Volume 16, pp. 1874-1877, 2005) teaches the fabrication steps involved in making a wire grid polarizer made up of a glass substrate and aluminum grating. It should, however, be noted that Ahn et al.'s fabrication technique is targeted towards microdisplay-based projection systems. Ahn et al.'s paper is incorporated in its entirety in this application.

Figure 6:
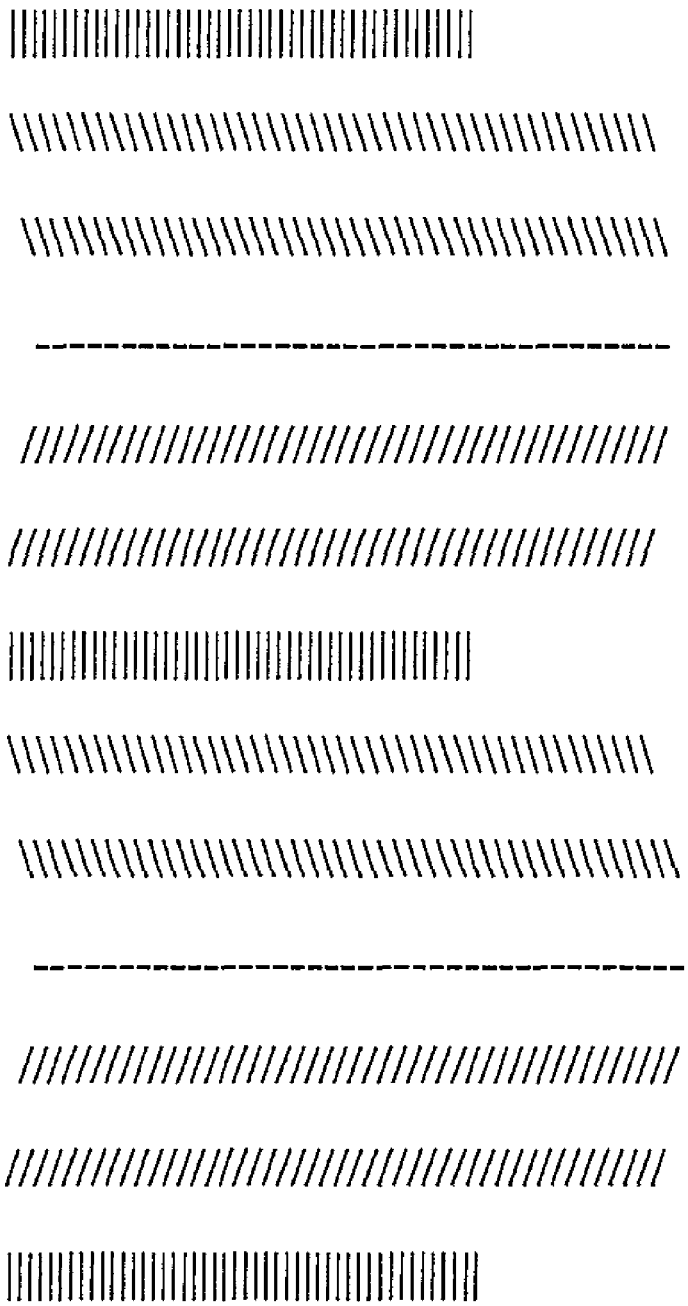
FIG. 6 illustrates an example of an output pattern of an "S" shape approximated by a stepped varied angle.

In another embodiment, electron-beam lithography is used to produce linear (continuous) regions of one polarizing direction. This is a second, less ideal approach used to produce the device. A finite number of regions at differing angles are produced that approximate the "S" curve above. These are produced at a tolerance above the human threshold of vision (because of the nano-engineered nature of WGP's). The resulting pattern is illustrated in FIG. 6. The article by Chen et al. titled "Large flexible nanowire grid visible polarizer made by nanoimprint lithography" (*Applied Physics Letters*, Volume 90, 2007) teaches a method involving the deposition of Aluminum to form a flexible wire grid polarizer. It should, however, be noted that Chen et al.'s fabrication technique is targeted towards flat panel displays and microdisplays. Chen et al.'s paper is incorporated in its entirety in this application.

In yet another embodiment, standard continuous wire grid polarizers are laminated on a continuously varying wave plate (retarder). A wave plate will rotate the orientation of pre-selected (polarized) light an amount determined by its thickness. A wave plate with a thickness that varies in a repeating pattern, laminated over a linear polarizer, can produce a polarization pattern similar to the desired "S" pattern described above. These can potentially be produced using a technique similar to NIL or with one similar to lenticular printing, or with one similar to deposition.

Table 1 below depicts the various embodiments associated with the present invention's effective implementation of window shading applications.

TABLE 1

| Polarizer | Continuously Variable Component |
| --- | --- |
| Wire Grid Polarizer | Continuously Varying Absorption Axis Orientation |
| Wire Grid Polarizer | Continuously Varying Thickness Wave Retarder |
| Standard Polarizer | Continuously Varying Thickness Wave Retarder |

In one embodiment, the present invention provides for a light transmissive panel comprising: a first sheet; and a second sheet, wherein each of the first and second sheets comprise a nonbirefringant substrate and a polarizing pattern of continuously varying absorption axis formed on said nonbirefringant substrate. The first and second sheets are mechanically translatable relative to each other, wherein the mechanical translation controlling transmission of light through said light transmissive panel.

Figure 7A:
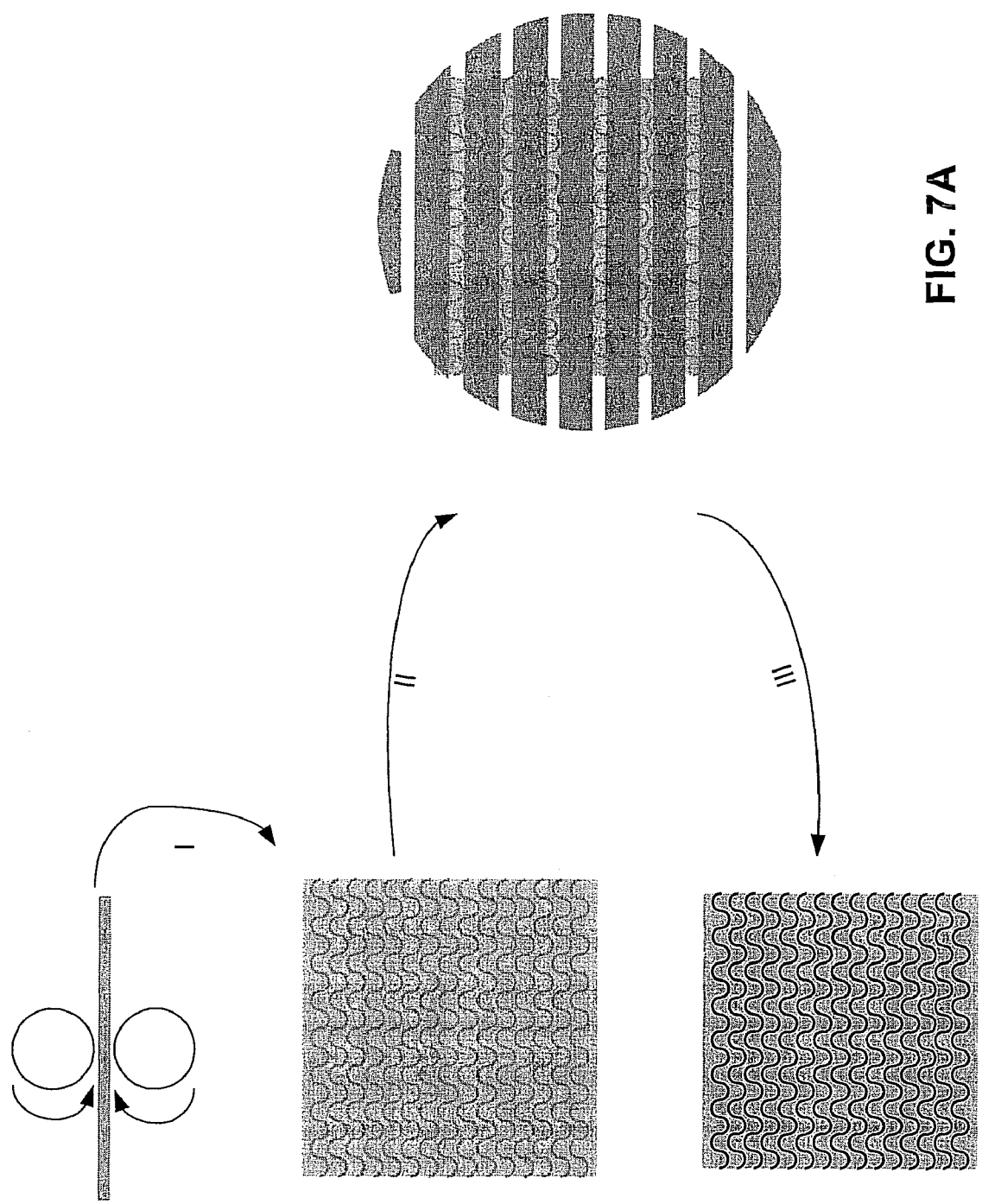
FIG. 7A illustrates the process for manufacturing continuously varying absorption axis orientation wire grid polarizers.

FIG. 7A illustrates the process for manufacturing continuously varying absorption axis orientation wire grid polarizers. The process begins by stamping a desired pattern into a plastic transparent substrate (shown as roman number I in FIG. 7A). Next, patterned plastic is then masked off in strips with a rotating mask (shown as roman number II in FIG. 7A). As the mask is rotated, a spray deposition process coats the orthogonal ridges. Further, the spray coat source rotates with the mask. The previous coating step coats the rigid plastic with metal only on the side of the ridges, which effectively results in metal lines being formed (shown as roman number III in FIG. 7A). Lastly, two panels are produced, wherein the panels are assembled into a selective light blocking device.

Figure 7B:
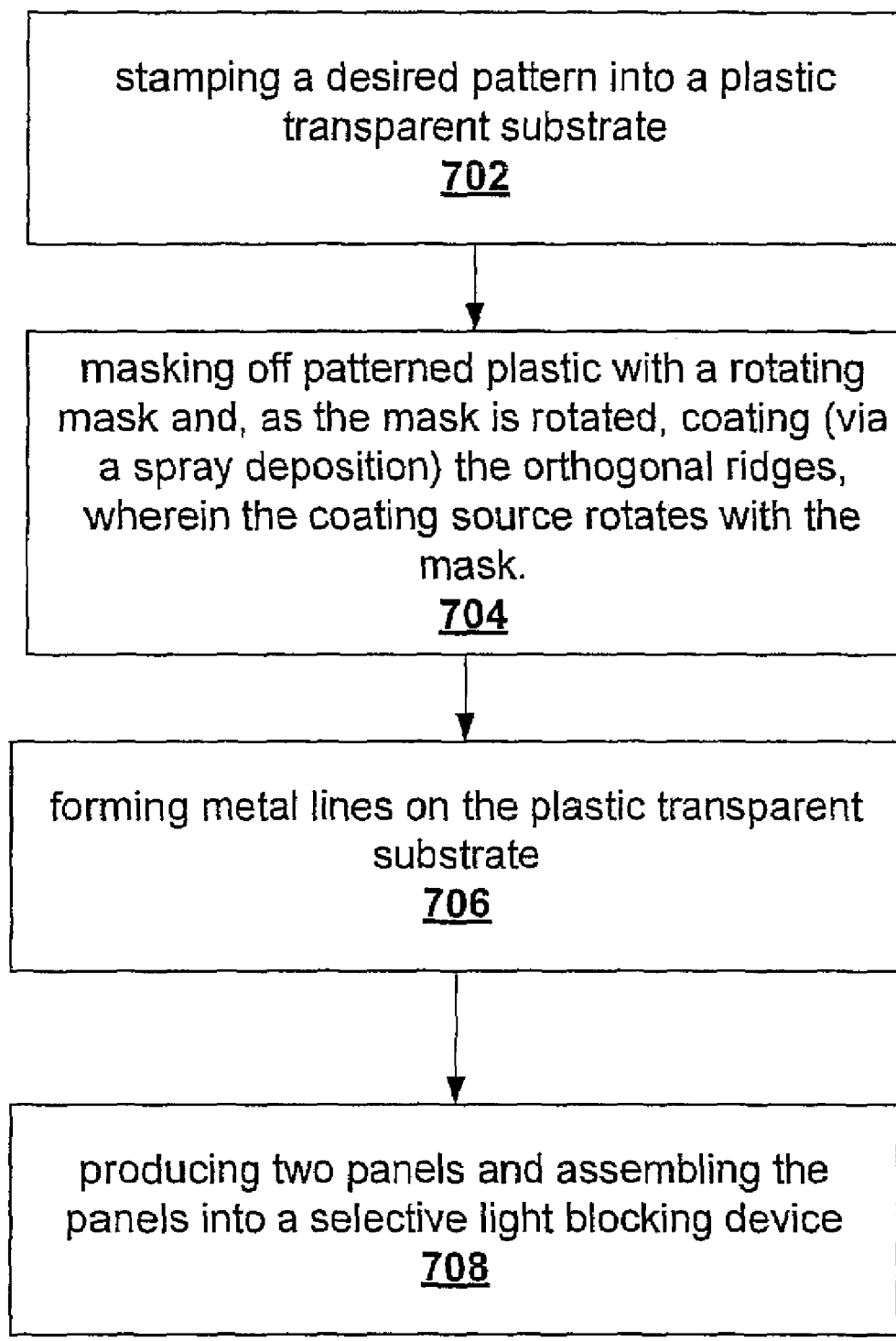
FIG. 7B illustrates a flowchart associated with the process depicted in FIG. 7A.

FIG. 7B illustrates a flowchart associated with the process depicted in FIG. 7A. In step 702, a desired pattern is stamped into a plastic transparent substrate. Next, in step 704, patterned plastic is then masked off in strips with a rotating mask and, as the mask is rotated, a spray deposition process coats the orthogonal ridges, wherein, the spray coat source rotates with the mask. The previous coating step coats the rigid plastic with metal only on the side of the ridges, which effectively results, in step 706, in metal lines being formed. Lastly, in step 708, two panels are produced, wherein the panels are assembled into a selective light blocking device.

Figure 7C:
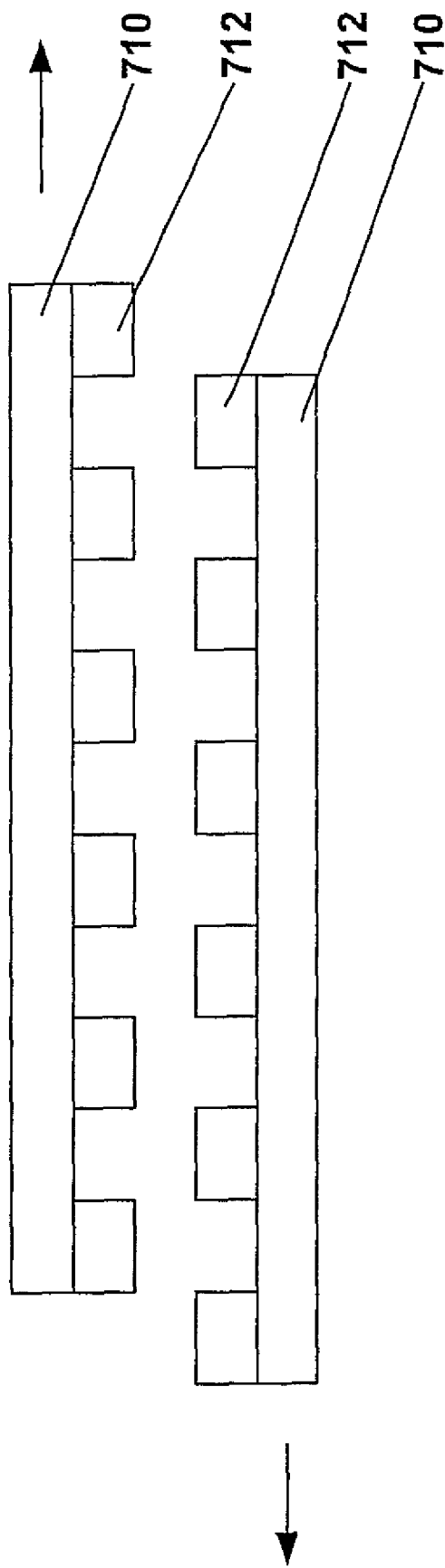

FIG. 7C illustrates the resultant structure formed based on the process shown and described in FIG. 7A-B. In FIG. 7C, reference numeral 710 represents the transparent substrate (e.g., transparent nonbirefringant substrate) and reference numeral 712 represents the metal lines on the substrate 710. Further, FIG. 7C depicts two panels that are mechanically translatable relative to each other.

In another embodiment, the present invention provides a light transmissive panel comprising: a first sheet and a second sheet, wherein each of the first and second sheets comprise a wire grid polarizer that is laminated with a continuous variable thickness wave plate retarder. The continuous variable thickness wave plate retarder rotates input light by an amount determined by the thickness of the wave plate retarder. The first and second sheets are mechanically translatable relative to each other, wherein the mechanical translation controls the transmission of light through said light transmissive panel.

In yet another embodiment, the present invention provides a light transmissive panel comprising: a first sheet and a second sheet, wherein each of said first and second sheets comprise a standard polarizer that is laminated with a continuous variable thickness wave plate retarder. The continuous variable thickness wave plate retarder rotates input light by an amount determined by the thickness of the wave plate retarder. The first and second sheets are mechanically translatable relative to each other, wherein the mechanical translation controls the transmission of light through said light transmissive panel.

It should be noted that instead of making continuously variable components, an alternative involves making stepped varying thickness and absorption axis devices that approach continuously varying devices. Table 2 provided below depicts the various embodiments associated with such an alternative approach.

TABLE 2

| Polarizer | Continuously Variable Component |
| --- | --- |
| Wire Grid Polarizer | Stepped Varying Absorption Axis Orientation |
| Wire Grid Polarizer | Stepped Varying Thickness Wave Retarder |
| Standard Polarizer | Stepped Varying Thickness Wave Retarder |

Figure 8A:
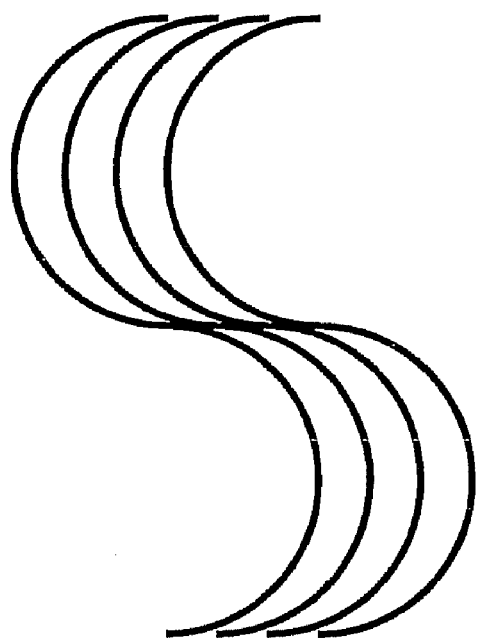
FIG. 8A illustrates the "S" pattern of the metal wires in a wire grid polarizer which provides a continuously varying absorption axis.
Figure 8B:
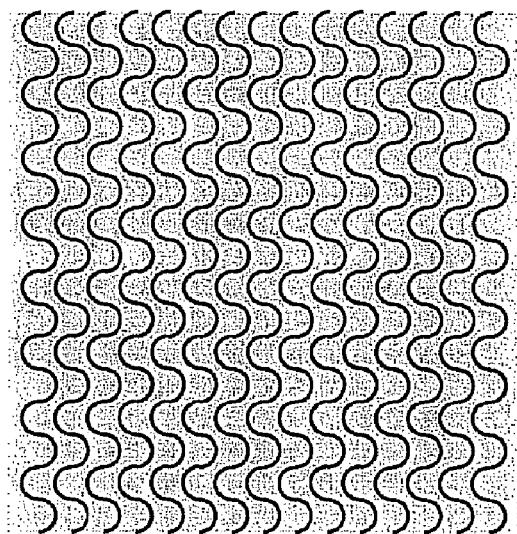
FIG. 8B illustrates the "S" shaped pattern of FIG. 8A as applied to a nonbirefringant substrate.
Figure 8C:
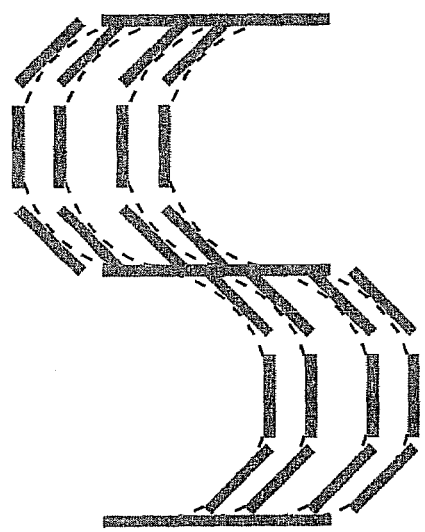
FIG. 8C illustrates a wire grid polarizer pattern having an absorption axis that varies in steps.
Figure 8D:
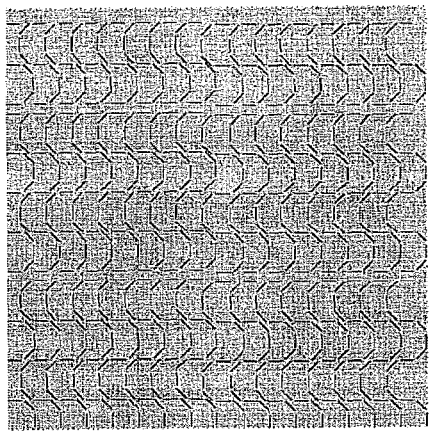
FIG. 8D illustrates the pattern of FIG. 8C as applied to a nonbirefringant substrate.
Figure 8E:
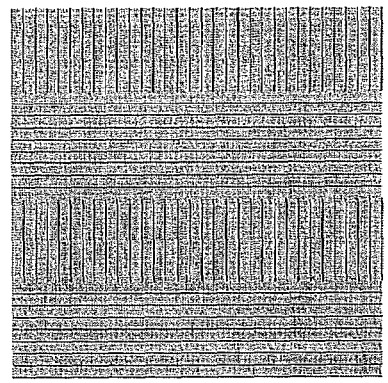
FIG. 8E illustrates a minimal design that consists of alternating vertical and horizontal orientations.

FIG. 8A illustrates the "S" pattern of the metal wires in a wire grid polarizer which provides a continuously varying absorption axis. FIG. 8B illustrates the "S" shaped pattern of FIG. 8A as applied to a nonbirefringant substrate. However, due to limitations in manufacturing, such an "S" shaped pattern has to be approached with straight lines. Such a pattern in shown in FIG. 8C, wherein the wire grid polarizer has an absorption axis that varies in steps. The setup shown in FIG. 8C approaches a continuously varying absorption axis. FIG. 8D illustrates the same pattern as applied to a nonbirefringant substrate. It should be noted that a minimal design would consist of alternating vertical and horizontal orientations as shown in FIG. 8E.

Figure 9A:
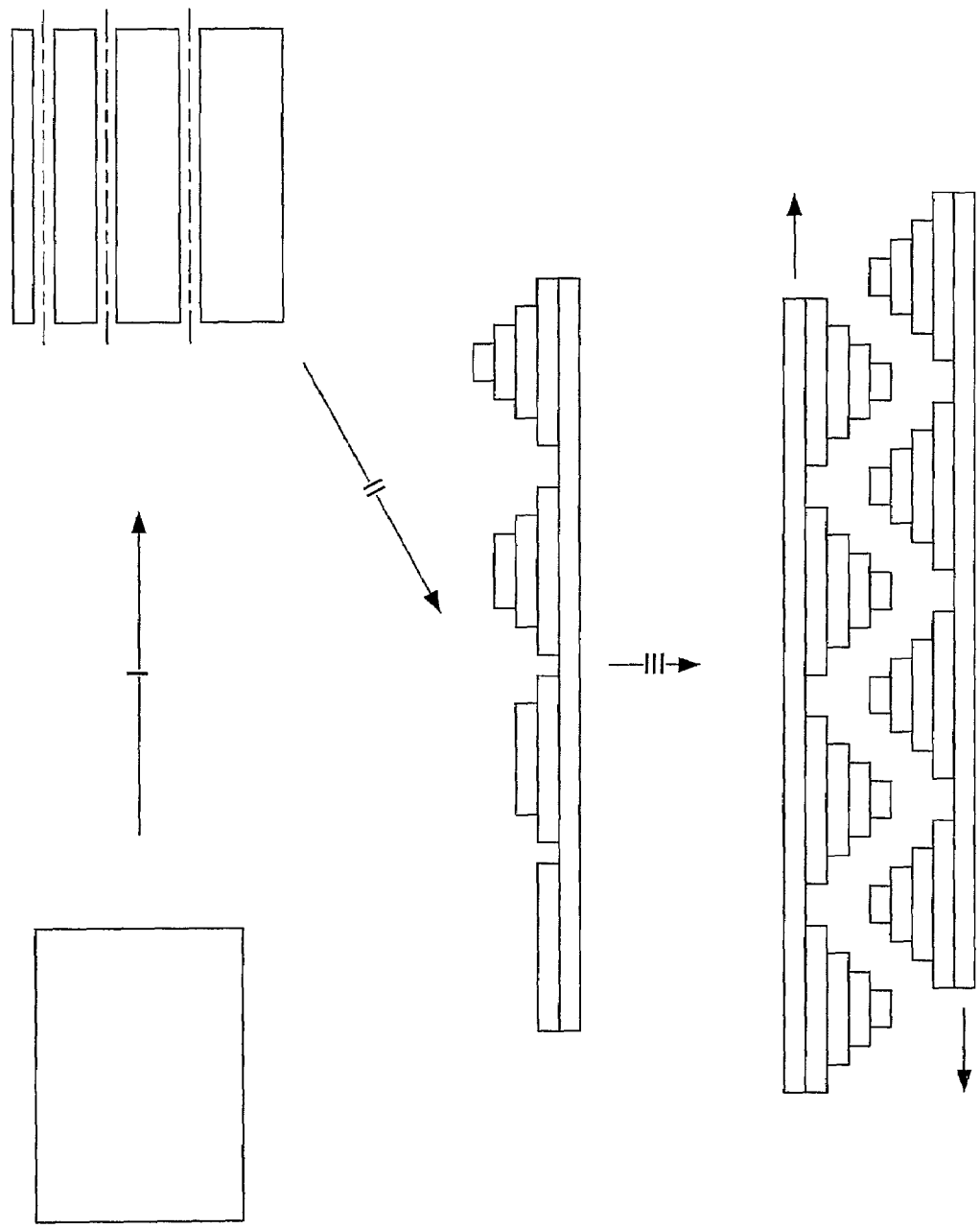
FIG. 9A illustrates a process associated with producing a stepped varying thickness wave retarder.

FIG. 9A illustrates a process associated with producing a stepped varying thickness wave retarder. As a first step, a regular wave retarder (e.g., a quarter wave retarder) is selected, wherein the selected wave retarder is to be used to make, for example, a four step retarder. Next, the selected wave retarder is cut into strips with number of thickness equal to the number required to form a full wave retarder (as shown as roman number I in FIG. 9A). For example, the selected wave retarder is cut into 4 different thicknesses. As a next step, the strips are layered onto either a wire grid polarizer or a standard polarizer or a standard polarizer using an optically clear adhesive (as shown as roman number II in FIG. 9A). Lastly, two panels are produced, wherein the panels are assembled into a selective light blocking device and, wherein, the panels are mechanically translatable relative to each other (as shown as roman number III in FIG. 9A).

Figure 9B:
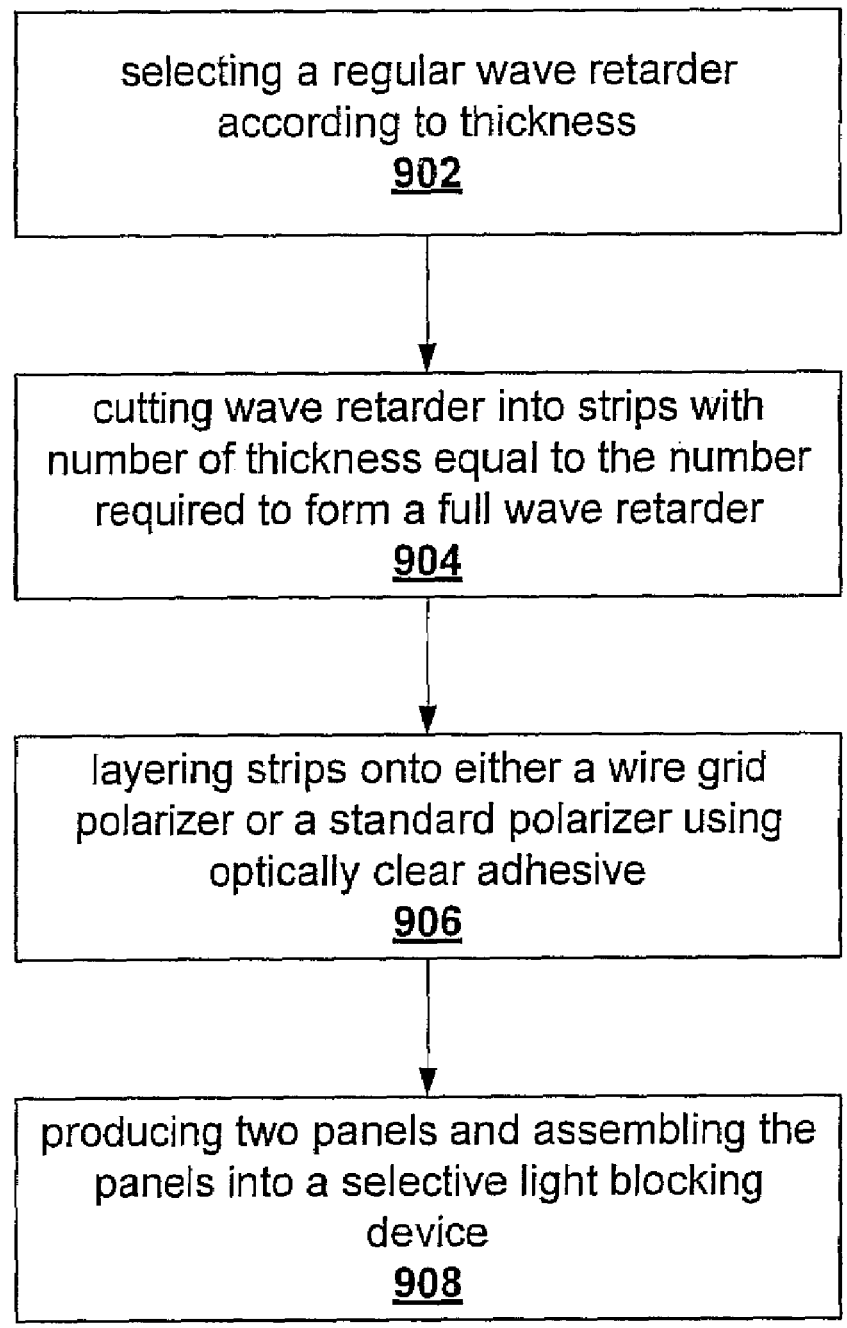
FIG. 9B illustrates a flowchart associated with the process depicted in FIG. 9A.

FIG. 9B illustrates a flowchart associated with the process depicted in FIG. 9A. In step 902, a regular wave retarder (e.g., a quarter wave retarder) is selected, wherein the selected wave retarder is to be used to make, for example, a four step retarder. In step 904, the selected wave retarder is cut into strips with number of thickness equal to the number required to form a full wave retarder. For example, the selected wave retarder is cut into 4 different thicknesses. In step 906, the strips are layered onto either a wire grid polarizer or a standard polarizer or a standard polarizer using an optically clear adhesive. In step 910, two panels are produced, wherein the panels are assembled into a selective light blocking device and, wherein, the panels are mechanically translatable relative to each other.

Figure 10A:
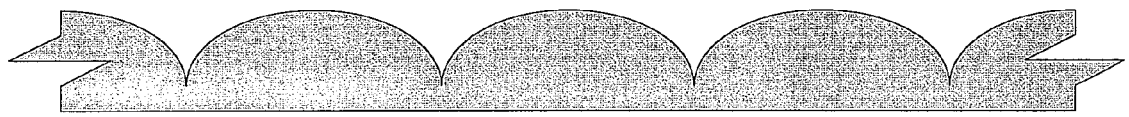
FIG. 10A through FIG. 10C illustrates an ideal design and the proposed design of the stepped varying thickness wave retarder.
Figure 10B:
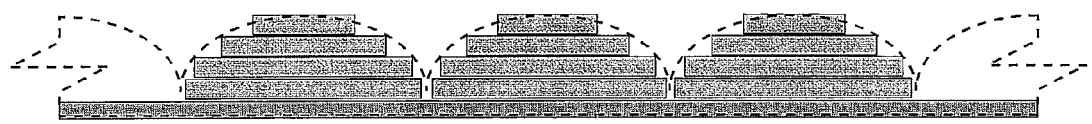
Figure 10C:
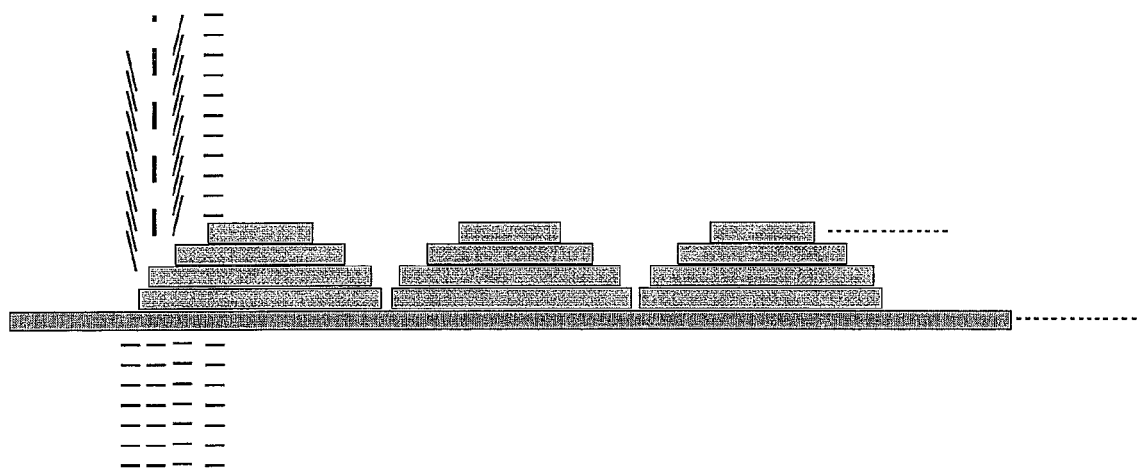

FIG. 10A illustrates the ideal design intended to rotate light in a continuous pattern. As previously mentioned, due to limitations in manufacturing, this design may be approached in a stepped manner. FIG. 10B illustrates such a stepped design. FIG. 10C illustrates the proposed varying thickness retarder that approaches a continuous pattern of rotated light. It should be noted that each of the four layers shown can be quarter wave retarders, which are placed on a standard polarizer or wire grid polarizer using an optically clear adhesive.

CONCLUSION

A system and method has been shown in the above embodiments for the effective implementation of window shading applications using wire grid polarizers and varied thickness wave retarders. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by specific technique used to form the wire grid polarizer.

The invention claimed is:

1. A light transmissive panel comprising:
   a first sheet comprising a first non-birefringent substrate, a first standard linear polarizer layer over the first substrate wherein the entire first polarizer layer comprises a single standard linear polarizer, and a first wave retarder layer over the first polarizer layer wherein the first wave retarder rotates light by a first amount; and
   a second sheet comprising a second non-birefringent substrate, a second standard linear polarizer layer over the second substrate wherein the entire second polarizer layer comprises a single standard linear polarizer, and a second wave retarder layer over the second polarizer layer wherein the second wave retarder rotates light by a second amount;
   said first and second sheets being mechanically translatable relative to each other, said mechanical translation controlling transmission of light through said light transmissive panel,
   wherein the first and second wave retarder layers are located between the first and second standard linear polarizer layers,
   wherein the first standard linear polarizer layer defines a first plane and the first wave retarder layer has a thickness varying in a direction perpendicular to the first plane, and
   wherein the second standard linear polarizer layer defines a second plane and the second wave retarder layer has a thickness varying in a direction perpendicular to the second plane.

2. The light transmissive panel of claim 1, wherein said first and second wave retarders are each wave retarders of continuously varying thickness.

3. The light transmissive panel of claim 1, wherein said first and second wave retarders have a discretely varying thickness in order to approach a continuously varying pattern.

4. The light transmissive panel of claim 1, wherein said translation controls transmission of light on a gray scale from near 50% to near 100% opacity.

5. The light transmissive panel of claim 1, wherein said panel is a window, skylight, or aftermarket augmentation to either.

6. A light transmissive panel comprising:
   a first sheet comprising a first non-birefringent substrate, a first standard linear polarizer layer over the first substrate wherein the entire first polarizer layer comprises a single standard linear polarizer, and a first wave retarder layer over the first polarizer layer wherein the first wave retarder rotates light by a first amount; and
   a second sheet comprising a second non-birefringent substrate, a second standard linear polarizer layer over the second substrate wherein the entire second polarizer layer comprises a single standard linear polarizer, and a second wave retarder layer over the second polarizer layer wherein the second wave retarder rotates light by a second amount;
   said first and second sheets being mechanically translatable relative to each other, said mechanical translation controlling transmission of light through said light transmissive panel,
   wherein the first and second wave retarder layers are located between the first and second standard linear polarizer layers,
   wherein said first and second wave retarders are each variable wave retarders.

* * * * *